R. W. SAMPSON.
TIRE PLUG.
APPLICATION FILED FEB. 10, 1916.
1,221,479. Patented Apr. 3, 1917.
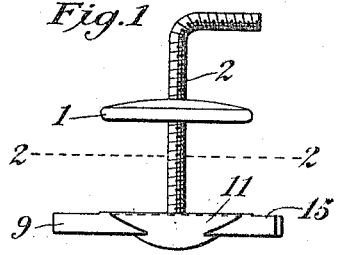
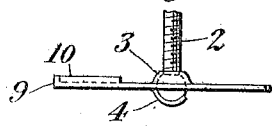
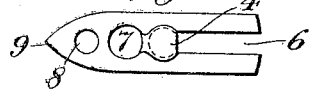
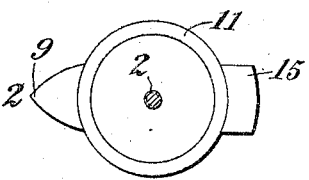
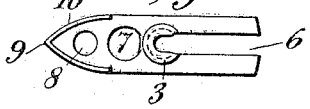
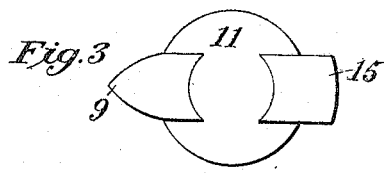
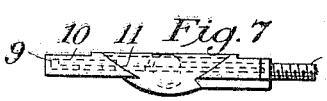
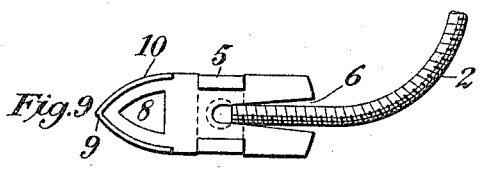
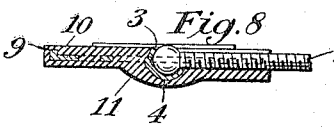
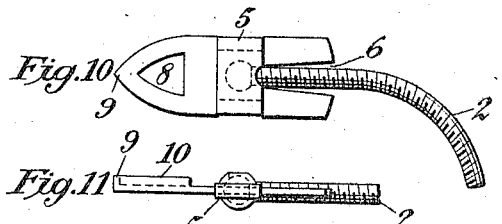
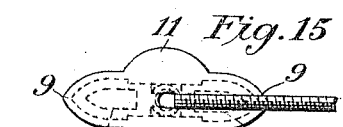
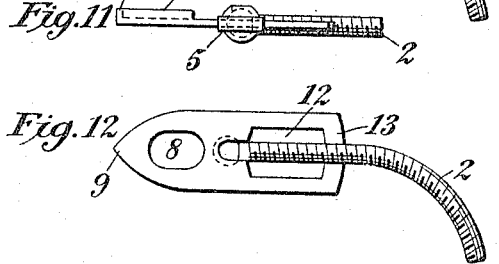
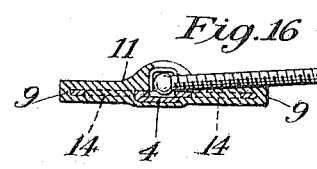
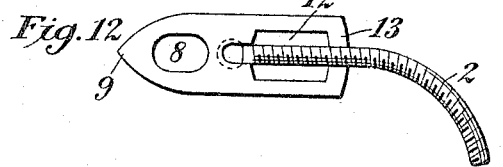
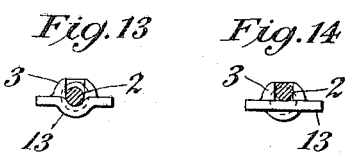
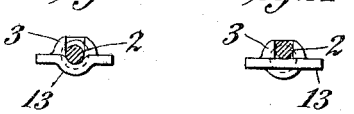
Witness:
Chas. R. King.
Inventor:
Robert W. Sampson.
by Andrew Wilson.
His Attorney.

UNITED STATES PATENT OFFICE.

ROBERT W. SAMPSON, OF WHITESTONE, NEW YORK, ASSIGNOR OF ONE-HALF TO LOUIS SCHWAB, OF EAST ORANGE, NEW JERSEY.

TIRE-PLUG.

1,221,479.  Specification of Letters Patent.  Patented Apr. 3, 1917.

Application filed February 10, 1916. Serial No. 77,373.

*To all whom it may concern:*

Be it known that I, ROBERT WILLIAM SAMPSON, a subject of the King of Great Britain, residing at Melba, Whitestone, Long Island, New York, have invented certain new and useful Improvements in Tire-Plugs, of which the following is a specification.

My invention relates to that class of tire plugs which are provided with a hinged or swiveled head adapted to be thrust through a puncture in a tire or inner tube and secured in place through the medium of an exterior cap and a coöperating clamping shank. And my improvements are particularly directed to means for facilitating the introduction of the head through a puncture, both by bringing it into approximate alinement with the shank, and by causing it to press open a puncture so as to permit the passage of the head therethrough; while, at the same time, I secure a form of head which effectually seals the puncture upon the inner side.

In the drawings Figure 1 is an elevation of one of my improved plugs; Fig. 2 is a view of the same on the line 2, 2, looking down; Fig. 3 is a bottom view of Fig. 1; Fig. 4 is an elevation of the metal frame work of the head and the lower end of the shank; Fig. 5 is a bottom view of the same; Fig. 6 is a top view of the metal element of the head; Fig. 7 is a side view of the head with the shank brought into alinement therewith; Fig. 8 is a longitudinal sectional view of the same; Fig. 9 is a plan view of a modified form of the metal frame for a head, with its shank; Fig. 10 is a bottom view of the same; Fig. 11 is an edge view of the same; Fig. 12 is a plan view of another modification; Fig. 13 is an end view of Fig. 12, looking to the left, the shank being cut off; Fig. 14 is a modification thereof; Fig. 15 is a plan view and Fig. 16 a longitudinal sectional view of another modification.

In all the figures similar parts are designated by similar reference numerals.

A suitable cap 1 is threaded upon a shank 2 in the well known manner, and the shank is hinged and swiveled to the metal blank or frame of the head, a suitable socket being provided therein, for instance by striking up the metal of the head into a socket 3 in which the head of the shank may be held by a suitable lip 4 struck down out of the body of the head and bent around the ball of the shank.

A modification is shown in Figs. 9, 10 and 11, wherein a strip 5 is clamped around the edges of the head blank so as to hold the ball of the shank in place. And other well known styles of hinging and swiveling the head to the shank may be used, if desired.

I prefer to form a slot or dove-tail 6 in one end of the metal head blank, to facilitate the bending down of the shank into approximate alinement with the head, as shown in several of the figures. And in the opposite end of the head blank I preferably form an opening or openings as 7, 8, the material from one of which may, if desired, be used to form the shank retaining lip 4. This end of the head blank is pointed as at 9, and is preferably provided with a marginal flange 10 extending on each side from the point back to the body of the head blank.

The head blank is embedded in a covering of rubber 11 which is molded to form a disk-like central portion, from one edge of which projects the pointed end 9 of the head blank; while from the opposite edge is extended the slotted end of the head blank, all portions of the blank, except the shank-receiving socket, being embedded in the rubber so that the space within the marginal flange 10, and the openings 7 and 8 and the slot or dove-tail 6 will be all filled with the rubber, which is thoroughly anchored to the head blank and extended out laterally therefrom.

The rubber filling the slot or dove-tail 6 yields before the shank 2 when it is bent over, as shown, for instance, in Figs. 7 and 8, so that the head and shank may be brought substantially into line. In Fig. 12 I have shown a modification wherein an opening 12 is formed instead of the slot 6, and the metal of that end of the head blank is carried across from one side to the other. And this portion 13 of the metal may be either bent down as shown in Fig. 13 or be left straight, as shown in Fig. 14, the elasticity of the rubber filling the space 12 being sufficient to permit the shank to be bent down as far as is necessary for the insertion of the plug into a puncture. In Figs. 15 and 16 I have shown another modification wherein the head of the plug is pointed at each end, openings as 14, 14, indicated by broken lines in Fig. 15, being preferably formed in the head blank to receive the rubber, and to allow it to yield downward when the shank is bent over. This construction allows either end of the head to be inserted through the puncture. And it also provides a construction wherein the head is evenly balanced so that its opposite ends secure equal bearings against the inside of the tire, and neither end will tend to overbalance the other.

It is for this purpose, of making the head balance evenly, that in the other forms I extend the slotted end of the head blank 15 out beyond the disk-like portion of the plug. For this arrangement overcomes any tendency which might otherwise exist for the head of the plug to be tilted unevenly, when clamped into place, because of the point 9 engaging with the inner surface of the tube or tire.

When a plug, consisting of a metal blank covered with rubber, is forced through a puncture in a tire or a tube, there is danger of the rubber covering, on that portion of the head which is first thrust through the puncture, being stripped or torn off the metal blank, by the resistance of the tire or tube. To guard against this, I form a bead or flange 10 around the pointed portion of the head blank, to afford a better anchorage for the rubber and to prevent the rubber within it from being stripped or torn away when the head is being pushed through a puncture. If desired, the rubber may be molded within but not over the flange 10; so that the flange will directly encounter the sides of the puncture through which the plug is being inserted; and the rubber will be protected by the flange from being torn away from the head blank; the important thing being to so form the penetrating end of the head that the metal will act as a shield or protection which will prevent the rubber from being loosened from the head blank when the plug is being inserted in a puncture.

By means of my improvements I secure a plug which can be thrust through a puncture without the use of special tools, the penetrating end of the head making a way for itself through the punctured material, the unsupported edges of the disk 11 folding in against the body of the head, but expanding again when the head has passed through the puncture, the extended ends of the head blank giving a well balanced bearing to the head, while its central, disk-like portion effectually covers and seals the puncture upon the inside, as a hinged head with an open, shank-accommodating slot could not do; for, the slot now being filled with yielding rubber pressed to duty by the compressed air, the head presents an unbroken sealing surface greatly increasing the efficiency of the repair.

Having thus described my invention what I claim and desire to secure by Letters Patent of the United States is:—

1. In a tire plug, the combination of interior closing means embodying a rigid base carrying an elastic body and provided with a pointed, puncture-penetrating element at one end and a comparatively splayed counterbalancing element at the other end, exterior closing means, and coöperating clamping means.

2. In a tire plug, the combination of interior closing means embodying a rigid base carrying an elastic body and provided with a pointed, puncture-penetrating element and an opposed, extended and posteriorly broad counterbalancing element, exterior closing means and coöperating clamping means.

3. In a tire plug, the combination of interior closing means embodying a rigid base provided with an end terminating in an angular point forming a puncture-penetrating element, and having an angular marginal flange, and embedded in an elastic body, clamping means pivotally connected to the head, and coöperating, exterior closing means.

4. In a tire plug, the combination of interior closing means, embodying a rigid base provided with a puncture-penetrating element and an opposed, extended, counterbalancing element having a substantial opening therethrough and being embedded in an elastic body which yieldably fills said opening, exterior closing means, and coöperating clamping means.

5. In a tire plug, the combination of interior closing means embodying a rigid base provided with a puncture-penetrating element having a substantial opening therethrough and an opposed, extended counterbalancing element, said base being embedded in an elastic body which yieldably fills said opening, exterior closing means and coöperating clamping means.

6. In a tire plug, the combination of interior closing means embodying a rigid base provided with a puncture-penetrating element having a substantial opening therethrough, and an opposed, extended, counterbalancing element having a substantial opening therethrough, said base being embedded in an elastic body which yieldably fills said openings, exterior closing means, and coöperating clamping means.

7. In a tire plug, the combination of interior closing means embodying a rigid base having a puncture-penetrating element and a shank-accommodating opening therethrough, an elastic body carried by the base and yieldably filling the shank-accommodating opening, exterior closing means, and a coöperating, clamping shank.

8. In a tire plug, the combination of interior closing means embodying a puncture sealing, elastic body carried by a skeletonized base provided with a puncture-penetrating element extended beyond the puncture sealing portion of the elastic body, exterior closing means, and coöperating means for clamping the interior and exterior closing means toward each other.

9. In a tire plug, the combination of interior closing means embodying an elastic, disk-like sealing element carried by a comparatively rigid base one portion of which is extended beyond the said sealing element to form a puncture-penetrating element, exterior closing means, and coöperating clamping means.

10. In a tire plug, the combination of interior closing means embodying an elastic, disk-like sealing element carried by a narrower and comparatively rigid base one portion of which is extended beyond the said sealing element to form a puncture-penetrating element, exterior closing means, and coöperating clamping means.

11. In a tire plug, the combination of interior closing means embodying a rigid base provided with a counterbalancing element, an opposed puncture-penetrating element having a substantial opening therethrough and an integral and partially detached shank-retaining element upon the under side of the base, said base being embedded in an elastic body which yieldably fills said opening, exterior closing means and coöperating clamping means.

12. In a tire plug, the combination of interior closing means embodying a rigid base provided with a counterbalancing element, having a substantial opening therethrough, an opposed puncture-penetrating element, and an integral and partially detached shank-retaining element upon the under side of the base, said base being embedded in an elastic body which yieldably fills said opening, exterior closing means and coöperating clamping means.

13. In a tire plug, the combination of exterior closing means, a clamping shank, and interior closing means embodying a comparatively rigid base having an opening therein, embedded in an elastic body, and pivoted to the clamping shank, the elastic body in the opening in the base being adapted to yield to allow the interior closing means to be brought into approximate alinement with the shank.

14. In a tire plug, the combination of interior closing means embodying an elongated base having openings therethrough and an elastic body yieldably filling said openings and extending laterally from the base to form a central, sealing element adapted under pressure to yield locally upon and through the openings in the base, exterior closing means, a coöperating clamping shank, and means permitting the shank to be brought into approximate alinement with the plane of the upper face of the interior closing means or to be placed at right angles thereto.

15. In a tire plug, the combination of interior closing means embodying an expanded, elastic, sealing element having an annular rim or bead upon its upper face and a comparatively rigid base narrower than and disposed transversely of the sealing element and extending beyond the side thereof to form a puncture-penetrating element, exterior closing means, and coöperating clamping means pivotally connected to the aforesaid base.

16. In a tire plug, the combination of interior closing means embodying an elastic body carried by a substantially rigid base provided with an angularly pointed, puncture-penetrating element having anti-stripping means extending backward from the angular point, exterior closing means and coöperating clamping means.

ROBERT W. SAMPSON.

Witnesses:
HOWARD M. ROWE,
AGNES GERHAUSEN.

Copies of this patent may be obtained for five cents each, by addressing the "Commissioner of Patents, Washington, D. C."